US008738421B1

(12) United States Patent
Ali

(10) Patent No.: US 8,738,421 B1
(45) Date of Patent: May 27, 2014

(54) DRIVER MODERATOR METHOD FOR RETAIL SALES PREDICTION

(71) Applicant: Koc Universitesi, Istanbul (TR)

(72) Inventor: Ozden Gur Ali, Istanbul (TR)

(73) Assignee: Vehbi Koc Foundation Koc University, Istanbul (TR)

( * ) Notice: Subject to any disclaimer, the term of this patent is extended or adjusted under 35 U.S.C. 154(b) by 0 days.

(21) Appl. No.: 13/736,964

(22) Filed: Jan. 9, 2013

(51) Int. Cl.
*G06Q 10/00* (2012.01)

(52) U.S. Cl.
USPC ............................ 705/7.29; 705/7.31; 705/28

(58) Field of Classification Search
USPC ................................. 705/7.25, 7.29, 7.31, 28
See application file for complete search history.

(56) References Cited

U.S. PATENT DOCUMENTS

| 7,376,613 | B1 * | 5/2008 | Cofino et al. | 705/37 |
| 7,395,248 | B2 * | 7/2008 | Kates et al. | 706/12 |
| 2005/0114235 | A1 * | 5/2005 | Snyder et al. | 705/28 |

OTHER PUBLICATIONS

Strahl Jonas, 2011, Efficiency Maximization of Retail Campaigns, Faculty of Information and Natural Schences, pp. 1-33.*

* cited by examiner

*Primary Examiner* — Jonathan G Sterrett
*Assistant Examiner* — Stephen S Swartz
(74) *Attorney, Agent, or Firm* — Gokalp Bayramoglu

(57) ABSTRACT

A new method and a computer system to implement the method for SKU sales prediction in the presence of promotions for existing and new SKUs are introduced. These predictions are necessary for the retailer's order quantity decisions. Considering that the retailers are faced with shorter product life cycles and increasingly dynamic categories, they need tools that can cope with new SKUs and other changes in the category. The interpretability of the models is an important requirement for user acceptance of automated systems. The Driver Moderator method models are parsimonious and consistent across sister categories, and provide generalized insights across SKUs and stores into store, brand, SKU dynamics for various decisions such as category assortment or promotion planning.

7 Claims, 2 Drawing Sheets

DRIVER MODERATOR METHOD FOR RETAIL SALES PREDICTION

BACKGROUND

For operational efficiency retailers rely on accurate demand forecasts for individual Stock Keeping Units (SKUs). Order decisions need to ensure that the inventory level is not too high, to avoid high inventory costs, and not too low to avoid stock out and lost sales. Better forecasts at the SKU-store level can lead to better order quantity decisions. Forecasting stock keeping unit (SKU) sales in the presence of promotions is a particularly challenging task. Various studies in the marketing literature have shown that promotions, temporary price reductions, even a simple display have significant impact on the sales of the promoted product, and other products in the category. The sales in the previous and subsequent time periods are also affected as shoppers adjust purchasing behavior in anticipation of promotions or due to accumulation of purchased product. Further, seasonality, the preferences of the clientele at the particular store, the size of the package can all affect the size of the impact. Even more challenging is prediction of sales for new SKUs where sufficient data for constructing a model for the SKU does not exist. The SKU life cycle is becoming shorter, and the store manager is increasingly faced with the problem of providing an order quantity for a new SKU before its first promotion.

Several studies stress the need for model simplicity and ease of communication for user acceptance. Retail managers want to get a sense for how the predictions are made before they allow deployment of decision support models that have been trained (estimated) based on historical data. Beyond a face validity check, they want to make sure that the phenomena that the models have captured will continue to be present in the future time periods. Further, insights into store, brand and category dynamics are very valuable for the retail managers, who take pricing, promotion, and assortment decisions.

SUMMARY OF THE INVENTION

The objective of the invention is to develop a method to provide one-step-ahead SKU sales predictions in the presence of promotions, that a) is accurate in predicting sales at the SKU-store level, b) can be used to forecast sales in new situations, such as new SKUs, c) is interpretable and consistent in handling similar situations, and d) does not require inputs beyond the store level SKU sales, prices and promotions, and basic SKU characteristics.

A new method—the "Driver Moderator" method is introduced—for SKU—store level one step ahead sales prediction, in the presence of promotions for existing and new SKUs. The method handles similar situations consistently; it thus provides generalized actionable insights to retail managers. The Driver Moderator method generates an extensive set of features describing the static and dynamic characteristics of the SKU, category and store at the time the prediction is made. Its model structure ensures that the effects of the sales drivers, such as discounts or displays are consistent for similar situations as described by these features. The method pools observations across SKUs and stores, and uses the L1 norm regularized epsilon insensitive regression to simultaneously select a small and relevant subset of features and estimate their coefficients.

The Driver Moderator method is applied to a grocery store databases and compare its out-of-sample prediction accuracy for existing and new SKU sales, model complexity and consistency versus benchmark methods. It is shown that the method consistently picks the same features for similar categories, and give examples of the actionable insights that emerge from the models. Finally, a simulation of the retailer's order quantity decisions using the one-period-ahead predictions shows that using the Driver Moderator method increases sales while reducing the inventory level compared to SKU store level regressions, leading to doubling the inventory turns.

DETAILED DESCRIPTION

The method is based on four important design elements. First, a simple model structure is used to promote model simplicity and interpretability. Second, a large number of variables are used that leverage the rich domain knowledge about the effects of promotions. Third, data across SKUs, brands and stores within a subcategory are pooled, which increases the size of the training data set and the observed ranges for the explanatory variables. Fourth, the model and select features are concurrently estimated thereby improving model simplicity and generalization ability.

Another benefit of using one model that generalizes over SKUs and stores rather than many SKU-store specific models is that the model can be used to forecast promotion sales for new SKU store combinations that were not present in the training data. The necessary input is an estimate of the average sales volume for the product in that store, which can come from a short sales history that does not need to contain promotions; or other market research methods that provide a base preference estimate for the SKU.

The features in this model consist of the un-moderated driver variables and the products of the driver and moderator variables. The richness of the domain knowledge about the drivers of SKU demand and their moderators results in a large number of features. On the other hand, a high number of model parameters versus number of observations increase the chance of over-fitting. When a model over-fits, it describes the noise in the data to decrease the estimation error. Consequently, it will have a high accuracy on the training data, but a low generalization capability, leading to poor out-of-sample prediction performance. Parsimony is desirable to avoid over-fitting the training data and to achieve model transparency and, interpretability. We aim to achieve parsimony with three design elements: 1) simple and restrictive model structure, 2) embedded feature selection by penalizing absolute value of the feature weights, and 3) ignoring minute errors when estimating the model coefficients.

Figure 1:
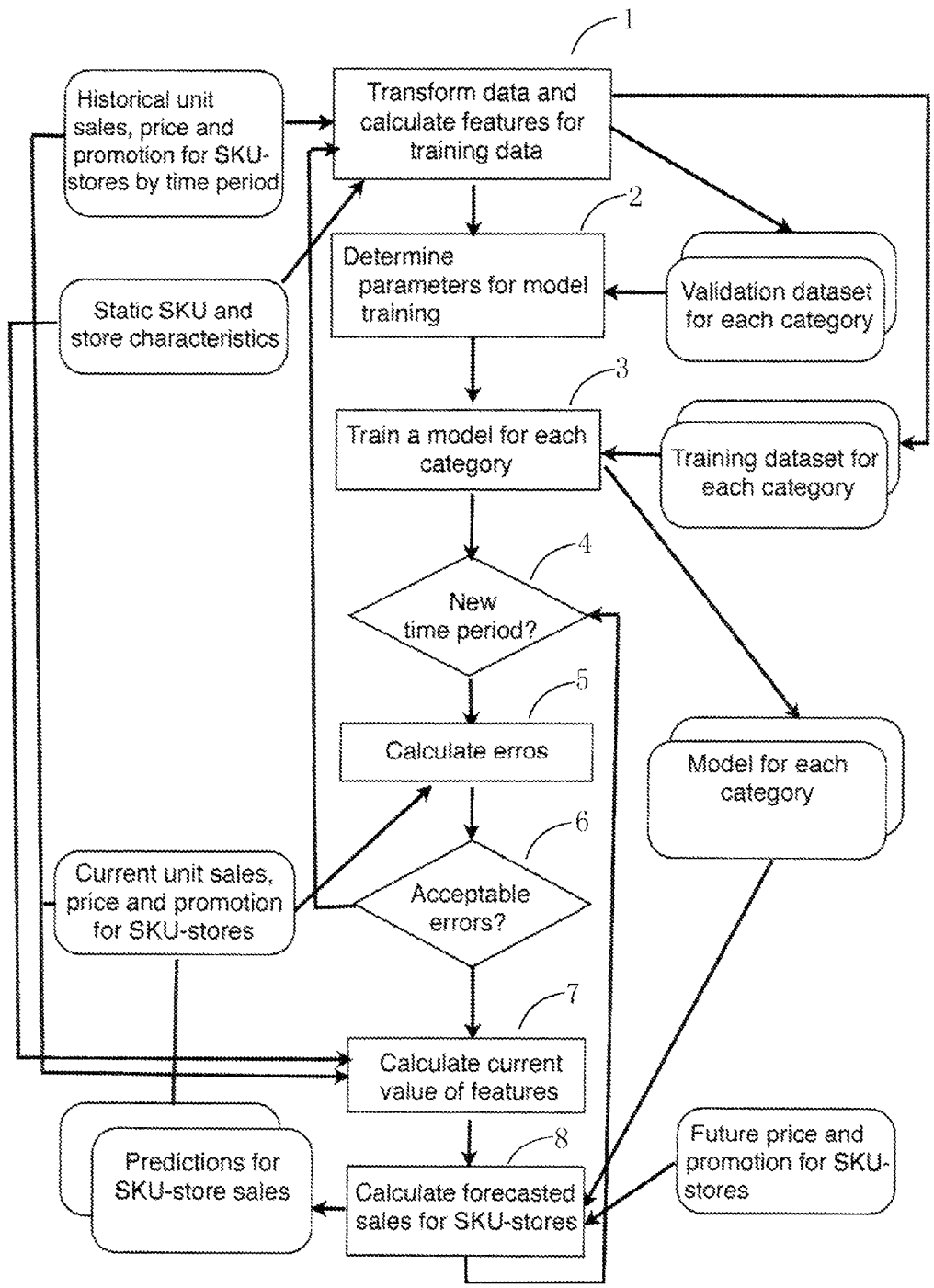
FIG. 1 shows the method used to calculate forecasted sales for SKU-stores

FIG. 1 shows an embodiment of the invention. In FIG. 1 step 1, the data is transformed and features for training data is calculated. The data used in step 1 for this calculation is the historical unit sales, price and promotion for SKU-stores by time period. In step 2, the parameters for model training are determined. Validation dataset for each category is used for the determination of the parameters for model training. Normalization of sales allows pooling of observations across SKUs and stores for training one model that is applicable to all SKU-store combinations in the subcategory. Under the usual approach of training separate models for each SKU-store combination one can estimate only the effect of events that have been frequently observed for this SKU in this store. The proposed model structure circumvents this problem by learning across SKUs and stores and describing the similarity of the situation with moderator variables. The moderator variables represent the circumstances that may cause these drivers to have a higher or lower effect on the particular SKU store sales at this time. The moderators can be static descriptors for the size, the brand, or the flavor of the SKU, similar to where the SKU is viewed as a combination of attribute values as they model consumer choice. But the moderator variables may also represent time variant (dynamic) characteristics, such as product share of the SKU in the store or the frequency of promotions for the brand in the last three months. We would, for example, suspect that the sales response to the same discount to decrease, if the customer comes to expect a discount every other week, versus once a year.

The normalized sales are modeled as a linear function of the drivers and their interaction with moderators, as follows in the equations. The driver variables represent the basic reasons why the SKU sales volume in a store will deviate from its average level, such as a change in the base preference for the SKU, discounts/promotions, and competitor discounts/promotions.

The normalized sales volume of SKU i in store j in time period t is modeled as a linear function of the moderated and non-moderated driver variables, as follows.

$$Y_{ijt} = S_{ijt}/A_{ijt}$$

$$Y_{ijt} = \sum_{d=1}^{D} X_{dijt}\left(w_{d0} + \sum_{k=1}^{K} w_{dk} M_{kijt}\right) + b + e_{ijt}$$

Where
$S_{ijt}$: unit sales for SKU i in store j in period t
$A_{ijt}$: average unit sales for SKU i in store j in the normalization period—up to but not including period t
$Y_{ijt}$: unit sales of SKU i in store j in time period t, normalized by the SKU-store average
$M_{kijt}$: moderator variable k for SKU i store j available in t−1 to predict sales in t
$X_{dijt}$: driver variable d for SKU i store j available in t−1 to predict sales in t
$w_{d0}$: the main effect parameter for driver variable d
$w_{dk}$: the interaction effect parameter for driver variable d moderated by moderator variable k
b: constant
$e_{ijt}$: error term This model structure essentially calculates the multiplier for a driver based on the static and dynamic characteristics of the SKU store combination and thereby ensures consistency in sales predictions under similar situations. Further, it makes the estimation process robust to noise, such as product delivery issues or weather conditions, which may affect a particular SKU-store in the training time period. From cognitive point of view, the model output is easier to interpret for managerial insights than a list of SKU-store specific coefficients. For example, the model may indicate that SKUs with high frequency of recent promotions have lower sales in the absence of promotions, rather than giving a list of SKUs with low non-promotion sales relative to their average sales.

In step 3, a model is trained for each category. Training dataset for each category is used in step 3 to train the model for each category.

In step 4, the method checks if there is a new time period.

In step 5, error is calculated. The current unit sales, price and promotion for SKU-stores data are used for calculating the errors in step 5. The model structure allows multiplicative interaction of drivers with moderators, but cannot express other nonlinear functions of the driver or moderator variables, or neural networks or random forests. Yet this restrictive nature also reduces the search space and the potential for over-fitting.

Feature selection methods are considered in three groups: filter, wrapper and embedded methods. Filter methods, such as correlation with the output variable, constitute a preprocessing step before model estimation to remove irrelevant variables. The wrapper method searches through the space of variable subsets using the estimated accuracy from the specific model as the measure of goodness for a particular variable subset—stepwise regression can be thought as a precursor to the wrapper method. Compared to the filter methods, wrapper methods provide more accurate solutions; however, in general they are slow and computationally very expensive for problems that have large number of variables. Embedded methods select variables during training and are model specific. An embedded feature selection method is used, namely L1 norm regularization of the objective function. In its simplest form, complexity penalties are present in the AIC/BIC model selection criteria which uses the L0 norm regularization—i.e. the number of variables used in the model. L1 norm regularization has been used in different contexts, such as drug design—where the sample size is small relative to the number of features, to select a sparse feature set. The Least Absolute Shrinkage and Selection Operator (LASSO) method, which minimizes the sum of squared errors subject to a bound on the sum of absolute values of coefficients, also employs the L1 norm. By comparison, ridge regression involves L2 norm regularization and penalizes large coefficient values, while keeping almost all variables. Thus, the use of the L1 norm regularization helps improve interpretability of the estimated model and eliminates the need for a separate feature selection step. This is particularly valuable in this context where the features consisting of the driver moderator interactions can be in the thousands, and therefore present a serious danger of over-fitting.

The objective function for estimating the model coefficients consists of the loss function and the regularization terms, as follows.

$$\min_{w}\left\{\sum_{d=1}^{D}\sum_{k=0}^{K}|w_{dk}| + \lambda\frac{1}{n}\sum_{ijt}\max(|e_{ijt}| - \varepsilon, 0)\right\}$$

Here n is the number of observations. The loss function involves the sum of the absolute errors that are greater than $\varepsilon$. In other words, it eliminates the incentive to increase model complexity, if the estimated values are within $\varepsilon$ of the actual values.

The $\lambda$ parameter in the objective function expresses the tradeoff between accuracy in the training dataset and the model complexity. A smaller $\lambda$ value favors less complex models. As we indicated earlier, high complexity is undesirable, due to over-fitting, but also because it decreases model interpretability. Black box models do not allow managers to evaluate whether the dynamics the model is based on will continue into the future, which may lead to lack of support for system implementation. On the other hand, interpretable models provide managerial insights that are very valuable in the data rich information poor environment of the high transaction volume retail setting.

In step 6, the error is checked to find out if the error is acceptable. If the error is acceptable then in step 7, current values of features are calculated. The historical unit sales, price and promotion for SKU stores by time period are used to calculate current value of features in step 7. Furthermore, the model that is generated for each model in step 3 is used in step 8 to calculate forecasted sales for SKU-stores.

In step 8, forecasted sales for SKU-stores are calculated. The data of future price and promotion for SKU-stores and model for each category are used for the calculation in step 8. Furthermore, predictions for SKU-store sales are also used in step 8 to calculate forecasted sales for SKU-stores.

Figure 2:
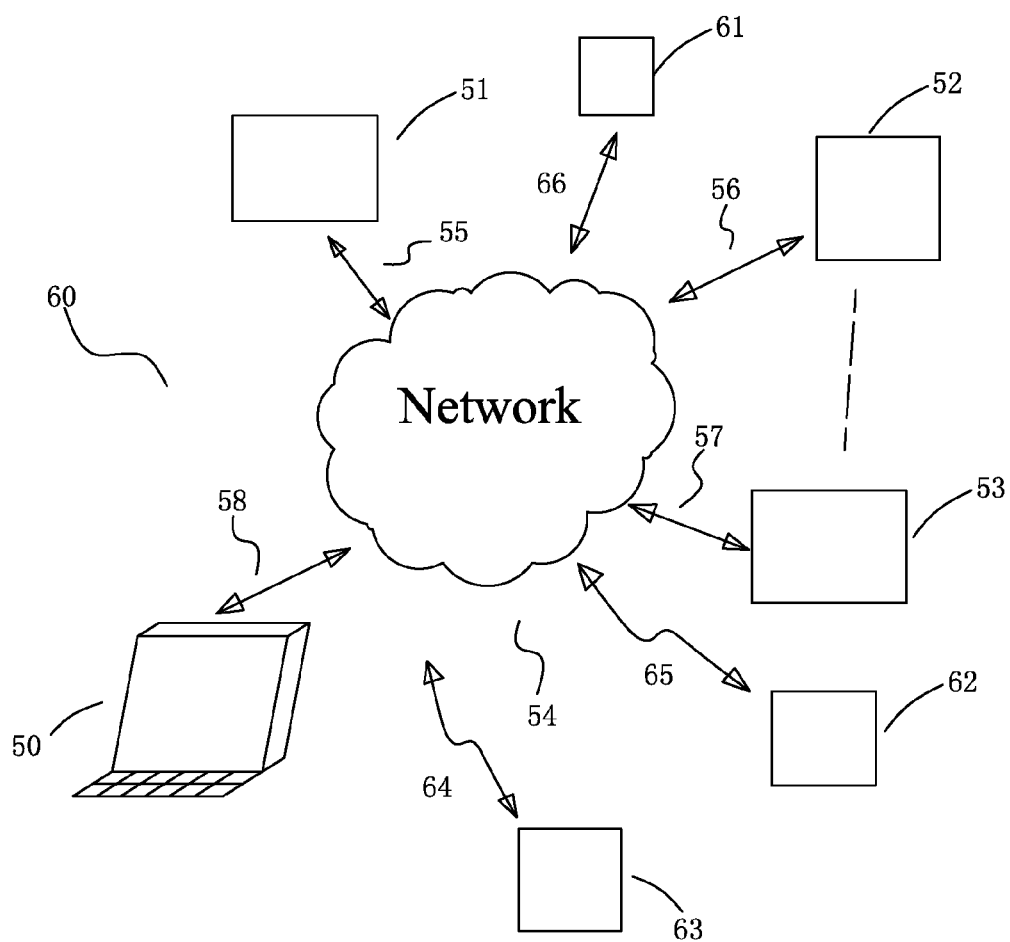
FIG. 2 shows the computer system to calculate forecasted sales for SKU-stores

FIG. 2 shows the computer system 60 for providing one-step-ahead SKU sales predictions in the presence of promotions. The storage units 51, 52 and 53 store the historical unit sales, price and promotion for SKU-stores by time period. The number of storage units depends upon the number of stores. The number of the storage units is not limited to any specific number. The storage units 61, 62 and 63 store static SKU and store characteristics. Three storage units are used in this embodiment. The number of storage units can be at least one storage unit and there is no limit as to how many storage units can be used. The number of storage units depends upon the number of stores. The storage units 51, 52, 53 and the storage units 61, 62 and 63 communicate with the computer unit 50 via the network 54. The connection between the storage units 51, 52 and 53 and the computer unit 50 can be a direct connection meaning that there may be either a wireless or wired connections between the storage units 51, 52 and 53 and the computer unit 50. Likewise the connection between the storage units 61, 62 and 63 and the computer unit 50 can be a direct connection meaning that there may be either a wireless or wired connection between the storage units 61, 62 and 63 and the computer unit 50. The computer 50 accepts data from storage units 51, 52, 53 and the storage units 61, 62, 63 and uses these data to create one-step-ahead SKU sales predictions in the presence of promotions. The algorithm that uses the following formulas is implemented in the computer 50:

$$Y_{ijt} = S_{ijt} / A_{ijt}$$

$$Y_{ijt} = \sum_{d=1}^{D} X_{dijt}\left(w_{d0} + \sum_{k=1}^{K} w_{dk} M_{kijt}\right) + b + e_{ijt}$$

$$\min_{w}\left\{\sum_{d=1}^{D}\sum_{k=0}^{K}|w_{dk}| + \lambda \frac{1}{n}\sum_{ijt}\max(|e_{ijt}| - \varepsilon, 0)\right\}$$

An example of the implementation of the Driver Moderator method is presented and the performance of the method is evaluated. Three extensive data sets were used in this evaluation. The data sets are multi-SKU, multi-store large datasets involving three sister subcategories in the black tea category: loose tea, teabag and pot teabag.

One model is trained for each subcategory across all stores and SKUs in that subcategory independently. The predictive accuracy of the models is predicted on the respective holdout test datasets that contain observations from more recent time periods than the training data to make sure that the evaluation procedure reflects the operational realities.

The dataset was provided by the leading grocery store chain, and contained daily unit sales, price, and feature information for five stores, and 115 SKUs in black tea category for a total of 451 SKU-store combinations over the Sep. 6, 2006-Sep. 30, 2008 time frame. The first 18 months data was used to create the variables and to generate the training data, and the remaining 7 months as validation and test data, out of which one fifth of the observations were randomly chosen as validation dataset, with the rest as test dataset. The data was not aggregated to the weekly level to avoid an aggregation bias due to frequent use of discounts covering only three days of the week (Saturday-Monday), and also because the retailer needed daily forecasts to update the daily order quantities.

Six driver variables were used as follows:
The recent level of focal SKU-store sales in the absence of promotions, which are calculated by using exponential smoothing on the sales of periods when the focal SKU was not promoted.
Marketing mix variables for the focal SKU-store, which include an indicator variable for whether the SKU is discounted, the discount percentage, and the number of promotions.
Indices for the competitor promotion intensity in the category and the subcategory that the focal SKU is in, which is calculated as the average discount percentage observed in the category or the subcategory, weighted by the historical shares of these products.

Further, 93 moderator variables were employed, including time invariant SKU attributes, such as brand, size, price category, flavor, store and subgroup; time variant descriptors SKU and category dynamics, such as category/subcategory size, SKU share of brand/category/subcategory, days since/into discount, frequency/depth of discounts for SKU/category/brand, lags of sales, and marketing mix variables; and store and seasonality indicators. This resulted in a total of 581 features consisting of drivers, their interactions with modifiers, and dummies for months and days.

An important complication in using store sales data to forecast sales is that the product availability on the shelf is not "known" to the model, and that we are able to observe sales but not demand for the products. When there is a shortage of items on the shelf, the unit sales cannot exceed a certain threshold, but with item availability on the shelf, the sales will be higher. Lacking the shelf availability information, we are really modeling sales, assuming the shelf availability will be similar to the training period availability. The proper way to deal with this complication is to include the item availability on the shelf in the model, however while the retailer keeps track of the store inventory for each item; items in the store do not necessarily translate to items on the shelf. The items may be in the storage area while the shelf is waiting to be restocked. To alleviate this problem to some extent, we have created an indicator variable for positive sales in the previous time period, with the expectation that zero sales in the previous day may provide an indication for an out-of stock item.

A related complication in store sales data is that there are no sales records when there is no sale, which may mean that the product was not available for sale, or that the product was available for sale but the customers did not buy it. Training a model with this data in the latter case will result in lost information and biased sales forecasts. Based on discussions with store managers we assume that if the item does not sell for two weeks or more, it was not on the shelf in that time period, otherwise we create a record with zero sales.

The drivers and moderators were standardized to zero mean and unit standard deviation in all training datasets.

TABLE 1

Training data statistics.

| Training data | % obs with discounts | Average number sold | N |
|---|---|---|---|
| T1 | 8% | 1.47 | 67023 |
| T2 | 5% | 1.48 | 36184 |
| T3 | 6% | 1.77 | 29339 |

The datasets are named as follows. T1, T2, T3 stand for the daily observations from the chain of loose tea, pot teabag, and teabag subcategories. Tables 1 and 2 provide the number of SKUs and SKU-store combinations present in each subcategory along with the discount frequency and average sales amount for the training and the test datasets, respectively. Notice that there is no overlap between the training and test dataset time periods, i.e., the model is trained with data from the earlier time period and tested on data from later time period. Further, there are two sets of test datasets, the first consisting of the ongoing SKU-store combinations that were also present in the training data and the second containing the new SKU-store combinations. The substantial number of the new SKUs and SKU-store combinations in the test time period stresses the need for methods that can provide sales predictions for new SKUs.

TABLE 2

Test data statistics

| | Ongoing SKUs | | | | New SKUs | | |
|---|---|---|---|---|---|---|---|
| Dataset | # SKUs | # SKU-stores | % obs with discounts | Avg. number sold | # SKUs | # SKU-stores | % obs with discounts | Average number sold |
| T1 | 57 | 217 | 7% | 1.26 | 5 | 20 | 17% | 1.08 |
| T2 | 30 | 117 | 6% | 1.22 | 2 | 8 | 4% | 0.71 |
| T3 | 16 | 72 | 5% | 1.56 | 5 | 17 | 6% | 0.81 |

In this section we evaluate the Driver Moderator model in terms of out-of-sample prediction accuracy on existing and new SKUs, model complexity and model consistency. Individual regressions for each SKU store combination constitute the main benchmark for estimating the practical impact of the method. Notice that this method can only produce predictions for SKU store combinations that have a sales history including promotions. The predictor variables are the relative price discount, number of promotions and the discount dummy. Additionally seasonal dummies are used for the daily T1-T3 datasets.

Further, to investigate effect of the estimation method and model structure, we compare the accuracy and complexity of the resulting Driver Moderator models with two methods that share the same driver and moderator variables and use the same pooled training sample. These two methods are a) the regression trees with extensive features method that was found to be the most accurate method for forecasting SKU sales in the presence of promotions, and b) the OLS stepwise regression model that uses the same features, i.e., drivers, moderators and their multiplicative interactions, as in the proposed method. By comparing the Driver Moderator method with the regression trees we evaluate whether the restricted model structure and estimation procedure have a negative effect on prediction accuracy. The comparison with the widely available stepwise regression procedure evaluates whether the additional sophistication in the model training with the epsilon insensitive regularized loss function is necessary.

We construct models with the Driver Moderator method and the benchmark methods for six learning tasks (three subcategories from the two case studies), using the training data. The $\epsilon$ values have been set to be one tenth of the error value observed in the best one variable regression model constructed in the training data. The $\lambda$ values were determined with a grid search, based on the validation set accuracy. The OLS stepwise regression models are fitted in SAS using the default significance level of 0.15. The M5P algorithm with default settings was used to train the regression tree. For each subcategory training and testing is performed independently of the other subcategories.

The $\lambda$ values were (0.011, 0.030, 0.024) and the $\epsilon$ values were (0.13, 0.11, 0.14) for T1-T3 respectively.

The Driver Moderator models are estimated using the Bundle Methods for Regularized Risk Minimization method. We measure the out-of-sample accuracy on the test datasets with mean absolute error of the predictions $\hat{Y}_{ijt}$. This allows SKU-store combinations of all sizes to contribute to the accuracy measure, as the $\hat{Y}_{ijt}$ are the predictions for the particular SKU-store combination normalized by its historical average number sold.

$$\hat{Y}_{ijt} = \sum_{d=1}^{D} X_{dijt}\left(w_{d0} + \sum_{k=1}^{K} w_{dk} M_{kijt}\right) + b$$

First, we report the out of sample prediction accuracy for the SKU-store combinations that present in the training and test time periods and have an individual regression model, to facilitate a fair comparison. Next, we report the accuracy for the subset of predictions where the focal SKU was promoted. Finally, we report the prediction accuracy figures for the new SKU-store combinations of Driver Moderator, regression tree and stepwise regression methods.

TABLE 3

Predictive accuracy on the holdout datasets for existing SKU store combinations, measured by mean absolute error of normalized sales.

| Dataset | Driver Moderator method | Regression tree with driver moderator variables | Stepwise regression with driver moderator features | Individual regressions | Number of observations |
|---|---|---|---|---|---|
| T1 | 0.86 | 0.95 | 0.94 | 1.92 | 24758 |
| T2 | 0.82 | 0.91 | 0.98 | 0.97 | 13733 |
| T3 | 0.79 | 0.94 | 0.84 | 0.87 | 9873 |
| Average | 0.81 | 0.93 | 0.92 | 1.25 | |

Table 3 shows the accuracy values for one-step-ahead predictions on the existing SKU test datasets across the four prediction methods, measured by the mean absolute error of normalized sales, whereas Table 4 focuses only on those observations where the SKU is discounted or promoted. As expected, all measures in Table 4 are higher compared to Table 3, indicating that forecasting sales in the presence of discounts and promotions is more difficult.

TABLE 4

Predictive accuracy on the holdout datasets in the presence of discounts for existing SKU store combinations, measured by mean absolute error of normalized sales.

| Dataset method | Driver Moderator moderator | Regression tree with driver moderator variables | Stepwise regression with driver features | Individual regressions | N |
|---|---|---|---|---|---|
| T1 | 1.32 | 1.50 | 1.46 | 13.62 | 1803 |
| T2 | 1.43 | 1.44* | 1.80 | 1.58 | 780 |
| T3 | 1.32 | 1.30* | 1.67 | 1.35* | 469 |

As explained earlier, for a fair comparison only the SKU store combinations that have enough historical data to construct an individual regression model have been included in these tables. For each dataset and benchmark method we tested the null hypothesis that the pairwise difference of the accuracy measures resulting from the benchmark method and the Driver Moderator method is zero. In the tables we have only indicated those cases where we could not reject the hypothesis at the 0.05 level with a star.

The accuracy figures in Tables 3 and 4 show clearly that the Driver Moderator method results in substantial improvements in predictive accuracy compared with the practical benchmark—the individual regressions. Comparing the Driver Moderator method column with the Individual regressions column in Table 3, we observe 9% to 55% improvement in the sales prediction accuracy (all significant at p<0.0001). Compared to individual regressions, the predictive accuracy of the Driver Moderator method is also superior in the presence of promotions for all datasets.

Comparing 'the Driver Moderator method' versus the 'Stepwise regression with driver moderator features' columns, we see that the proposed method results in 6% to 16% improvement. Similarly, in the presence of promotions, the Driver Moderator method uniformly provides better accuracy than the OLS stepwise regression that uses the same extensive feature set. This shows that the additional sophistication in the model training with the epsilon insensitive regularized loss function is paying off with better predictive accuracy.

Comparing the 'Driver Moderator method' and the 'Regression tree with driver moderator variables' columns we see that the proposed method provides 9% to 16% improvement in predictive accuracy. The same pattern is observed for promotion periods in Table 4.

Table 5 summarizes the predictive accuracy performances in forecasting sales for new SKUs that were not used to train the model. Since the individual regressions are specific to existing SKUs they cannot produce predictions for new SKUs. Therefore, the table provides accuracy values for Driver Moderator, and the benchmark methods that pool observations across SKUs and stores. The differences between the accuracy values of Driver Moderator method and the benchmark methods is significant at the <0.01 level. Compared to the Stepwise Regression the accuracy of the Driver Moderator method is significantly better for all datasets. The Driver Moderator method has better prediction accuracy in new SKUs compared to the Regression Tree.

TABLE 5

Predictive accuracy on the holdout datasets for new SKU store combinations, measured by mean absolute error of normalized sales.

| | Driver Moderator method | Regression tree with driver moderator variables | Stepwise regression with driver moderator features | Number of observations |
|---|---|---|---|---|
| T1 | 0.79 | 0.87 | 0.90 | 1816 |
| T2 | 0.98 | 1.05 | 1.15 | 696 |
| T3 | 0.95 | 1.17 | 1.09 | 1402 |

Model simplicity is a major component of model interpretability. We measure model complexity with the number of terms in the model for the Driver Moderator and the stepwise regression models, the number of leaves with regression models for the regression tree, and the number of regressions for the individual regressions. Table 6 provides a summary of the model complexity of the benchmark methods. The Driver Moderator models achieve the remarkable accuracy with only 7 to 32 features. They are significantly smaller than the stepwise regression models which have 116 to 164 variables. Compared with the regression trees with up to 42 leaves consisting of regressions with up to a hundred variables, the Driver Moderator models are much simpler. Even though individual regressions have few terms, the vast number of SKU store combinations in a single category (451) demonstrates the complexity that the retail managers have to deal with.

TABLE 6

Complexity of the Driver Moderator and benchmark models.

| Method Complexity measure | Driver Moderator method # of variables | Regression tree with driver moderator variables # of regression leaves with up to 100 variables | Stepwise regression with driver moderator features # of variables | Individual Regressions # of regressions with up to 15 variables |
|---|---|---|---|---|
| T1 | 32 | 42 | 164 | 217 |
| T2 | 7 | 5 | 116 | 117 |
| T3 | 16 | 6 | 129 | 72 |

Beyond simplicity, model consistency is an important characteristic that would inspire managerial confidence and contribute to the development of insights. To evaluate consistency we report the consistency of the selected features across sister subcategories and the signs of their coefficients.

Out of the 581 features 40 are used in the three subcategory models. 4 features are present in all three models, 7 are present in two out of three subcategory models, and 29 features are peculiar to a particular subcategory. The signs of the features that are present in all or two out of three subcategory models are the same across subcategories. Clearly, the fact that the sister categories have many common terms, and that all common terms have the same sign contributes to model consistency and interpretability.

A new method for SKU sales prediction in the presence of promotions for existing and new SKUs is introduced. These predictions are necessary for the retailer's order quantity decisions. Considering that the retailers are faced with shorter product life cycles and increasingly dynamic categories, they need tools that can cope with new SKUs and other changes in the category. The interpretability of the models is an important requirement for user acceptance of automated systems. The Driver Moderator method models are parsimonious and consistent across sister categories, and provide generalized insights across SKUs and stores into store, brand, SKU dynamics for various decisions such as category assortment or promotion planning.

Using extensive SKU level longitudinal sales and promotion datasets, the sales predictions for holdout data are more accurate than the practical benchmark—SKU store level regression analyses, and as good as or more accurate than the recent academic benchmark method. The use of the Driver Moderator method predictions in order decisions would increase the inventory turns ratio vis a vis the traditional individual regressions method, by increasing sales and stockouts while lowering inventories.

The new method uses a simple model structure to promote interpretability, a large number of variables to leverage the rich domain knowledge about the effects of promotions, pools observations across SKUs and stores within a subcategory to facilitate cross-learning, and simultaneously selects few relevant features among the thousands and estimates the model with an L1 norm regularized epsilon insensitive loss function—which is used for the first time in this context.

Although the present invention has been described with reference to the preferred embodiments thereof, it is apparent to those skilled in the art that a variety of modifications and changes may be made without departing from the scope of the present invention which is intended to be protected by the appended claims.

I claim:

1. A method using driver moderator model for providing one-step-ahead stock keeping unit sales predictions in the presence of promotions the method comprising:
pooling observations across SKUs and stores;
using L1 norm regularized epsilon insensitive regression for simultaneously selecting a small and relevant subset of features;
estimating driver-moderator model coefficients;
transforming historical unit sales, price and promotion for SKU-stores by time period;
calculating features for training data by using the data of historical unit sales, price and promotion for SKU-stores by time period and using the data of static SKU and store characteristics;
determining parameters for the model training wherein the determining step uses validation dataset for each category;
training the model for each category by accepting the parameters from the determining step and further accepting training data set for each category; and
determining the model coefficients, utilizing a computer, based on the model training;
wherein the computer determines the model coefficients using an objective function and reducing complexity by taking the difference of sum of the absolute error and a predetermined epsilon value, wherein the difference of sum of the absolute error and a predetermined epsilon value is calculated by the objective function which includes the following formula $$\min_w \left\{ \sum_{d=1}^{D} \sum_{k=0}^{K} |w_{dk}| + \lambda \frac{1}{n} \sum_{ijt} \max(|e_{ijt}| - \varepsilon, 0) \right\}$$

wherein:
$w_{dk}$: the interaction effect parameter for driver variable d moderated by moderator variable k;
$e_{ijt}$: error;
i: normalized sales volume of SKU;
j: store number;
t: time period;
$\lambda$: tradeoff parameter between accuracy in training dataset and the model complexity;
$\varepsilon$: a predetermined error level;
n: number of observation.

2. A computer system for providing one-step-ahead stock keeping unit sales predictions in the presence of promotions comprising:
means for storing historical unit sales, price and promotion for SKU-stores by time period;
means for storing static SKU and store characteristics; and
means for connecting the storage units and the computer unit;
a computer unit configured to estimate the model coefficients using an objective function and reducing complexity by taking the difference of sum of the absolute error and a predetermined epsilon value, wherein the difference of sum of the absolute error and a predetermined epsilon value is calculated by the objective function which includes the following formula $$\min_w \left\{ \sum_{d=1}^{D} \sum_{k=0}^{K} |w_{dk}| + \lambda \frac{1}{n} \sum_{ijt} \max(|e_{ijt}| - \varepsilon, 0) \right\}$$

wherein:
$w_{dk}$: the interaction effect parameter for driver variable d moderated by moderator variable k;
$e_{ijt}$: error;
i: normalized sales volume of SKU;
j: store number;
t: time period;
$\lambda$: tradeoff parameter between accuracy in training dataset and the model complexity;
$\varepsilon$: a predetermined error level;
n: number of observation.

3. The computer system of claim 2 wherein the parameter $\lambda$ can be set to a value to control the complexity of the model wherein a smaller value favors a less complex model and therefore eliminates the over-fitting issue while increasing model interpretability.

4. The computer system of claim 2 wherein the parameter $\lambda$ can be set to a value to control the complexity of the model wherein a larger value favors a more complex model and therefore creating an over-fitting issue while increasing model interpretability.

5. The computer system of claim 2 wherein the error term $\varepsilon$ is set to a predetermine value such that the model complexity can be reduced by increasing the value of the error term $\varepsilon$.

6. A method using driver moderator model for providing one-step-ahead stock keeping unit sales predictions in the presence of promotions the method comprising:
pooling observations across SKUs and stores; using L1 norm regularized epsilon insensitive regression for simultaneously selecting a small and relevant subset of features;
estimating driver-moderator model coefficients;
transforming historical unit sales, price and promotion for SKU-stores by time period;
calculating features for training data by using the data of historical unit sales, price and promotion for SKU-stores by time period and using the data of static SKU and store characteristics;

determining parameters for the model training wherein the determining step uses validation dataset for each category;

training the model for each category by accepting the parameters from the determining step and further accepting training data set for each category;

determining the model coefficients based on the model training;

checking if there is a new time period and if there is a new time period calculating errors by using the model generated in the determining step and accepting data of current unit sales, price and promotion for SKU-stores;

checking if the error is acceptable based on a predetermined error criteria and if the error is acceptable going back to step of transforming data and calculating features for training data; and if the error is acceptable calculating current values of features by accepting data of historical unit sales, price and promotion for SKU-stores by time period, and using the data of current unit sales, price and promotion for SKU-stores;

calculating, using a computer, forecasted sales for SKU-stores by using the data of future price and promotion for SKU-stores and the model for each category, and providing the calculating results as the predictions for SKU-store sales;

wherein the following formula is used for calculating forecasted sales for SKU-stores $$Y_{ijt} = \sum_{d=1}^{D} X_{dijt}\left(w_{d0} + \sum_{k=1}^{k} w_{dk} M_{kijt}\right) + b$$

wherein:

$Y_{ijt}$: unit sales of SKU i in store j in time period t, normalized by the SKU-store average;

i: normalized sales volume of SKU;

j: store number;

t: time period;

$M_{kijt}$: moderator variable k for SKU i store j available in t−1 to predict sales in t;

$X_{dijt}$: driver variable d for SKU i store j available in t−1 to predict sales in t;

$w_{d0}$: the main effect parameter for driver variable d;

$w_{dk}$: the interaction effect parameter for driver variable d moderated by moderator variable k;

b: constant.

7. A computer system for providing one-step-ahead stock keeping unit sales predictions in the presence of promotions comprising:

means for storing historical unit sales, price and promotion for SKU-stores by time period;

means for storing static SKU and store characteristics; and means for connecting the storage units and the computer system;

a computer unit configured to forecast sales by converting historical and current unit sales, price and promotion for SKU-stores by time period to predictions for SKU-store sales by using the following formula:

$$Y_{ijt} = \sum_{d=1}^{D} X_{dijt}\left(w_{d0} + \sum_{k=1}^{k} w_{dk} M_{kijt}\right) + b$$

wherein:

$Y_{ijt}$: unit sales of SKU i in store j in time period t, normalized by the SKU-store average;

i: normalized sales volume of SKU;

j: store number;

t: time period;

$M_{kijt}$: moderator variable k for SKU i store j available in t−1 to predict sales in t;

$X_{dijt}$: driver variable d for SKU i store j available in t−1 to predict sales in t;

$w_{d0}$: the main effect parameter for driver variable d;

$w_{dk}$: the interaction effect parameter for driver variable d moderated by moderator variable k;

b: constant.

* * * * *